United States Patent
Park et al.

(10) Patent No.: US 7,740,811 B2
(45) Date of Patent: Jun. 22, 2010

(54) HYDROGEN GENERATOR HAVING DOUBLE BURNERS AND METHOD OF OPERATING THE SAME

(75) Inventors: Tae-sang Park, Suwon-si (KR); Dong-woo Lee, Seoul (KR); Soon-ho Kim, Seoul (KR); Doo-hwan Lee, Daejeon-si (KR); Hyun-chul Lee, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 914 days.

(21) Appl. No.: 11/507,548

(22) Filed: Aug. 22, 2006

(65) Prior Publication Data

US 2007/0154366 A1      Jul. 5, 2007

(30) Foreign Application Priority Data

Dec. 30, 2005    (KR) .......................... 2005-0135846

(51) Int. Cl.
*B01J 10/00* (2006.01)
*B01J 19/00* (2006.01)

(52) U.S. Cl. .................. 422/189; 422/198; 422/188; 422/190; 422/187; 422/170; 48/127.9; 48/61; 48/213; 48/212; 429/17; 429/19; 429/20; 60/780

(58) Field of Classification Search ............... 422/188, 422/198, 187, 190; 429/19, 17
See application file for complete search history.

(56) References Cited

U.S. PATENT DOCUMENTS

| | | | | |
|---|---|---|---|---|
| 6,162,267 A | * | 12/2000 | Priegnitz et al. | ....... 48/199 FM |
| 6,277,339 B1 | * | 8/2001 | Boneberg et al. | ............ 422/198 |
| 2003/0129470 A1 | * | 7/2003 | Tajima et al. | ................. 429/34 |
| 2005/0172553 A1 | * | 8/2005 | Zartenar et al. | ............ 48/127.9 |

FOREIGN PATENT DOCUMENTS

| | | |
|---|---|---|
| CN | 100542948 C | 9/2009 |
| JP | 2001-354404 | 12/2001 |
| JP | 2003-77511 | 3/2003 |
| JP | 2004-31280 | 1/2004 |
| KR | 2004-96977 | 11/2004 |

OTHER PUBLICATIONS

Office Action issued in Korean Patent Application No. 2005-135846 in Nov. 15, 2006.
Chinese Certificate of Patent No. 200610121564.6 issued Sep. 23, 2009.

* cited by examiner

*Primary Examiner*—Alexa D. Neckel
*Assistant Examiner*—Kaity V. Handal
(74) *Attorney, Agent, or Firm*—Stein McEwen, LLP

(57) ABSTRACT

A hydrogen generator having double burners and a method of operating the samewhere the hydrogen generator includes a housing, a barrier wall to divide a space in the housing into a first chamber and a second chamber, a fuel reformer installed in the first chamber, a first burner installed in the first chamber to heat a fuel reformer, a shift reactor installed in the second chamber, a second burner mounted in the barrier wall to heat the shift reactor, and a first igniter and a second igniter respectively ignite the first burner and the second burner.

15 Claims, 3 Drawing Sheets

HYDROGEN GENERATOR HAVING DOUBLE BURNERS AND METHOD OF OPERATING THE SAME

CROSS-REFERENCE TO RELATED APPLICATIONS

This application claims the benefit of Korean Application No. 2005-135846, filed on Dec. 30, 2005 in the Korean Intellectual Property Office, the disclosure of which is incorporated herein by reference.

BACKGROUND OF THE INVENTION

1. Field of the Invention

Aspects of the present invention relate to a hydrogen generator having double burners and a method of operating the same, and more particularly, to a hydrogen generator having double burners in order to reduce the time taken to begin a shift reaction in a shift reactor and a method of operating the same.

2. Description of the Related Art

A fuel cell is an electricity generating system that transforms the chemical energy of hydrogen and oxygen into electrical energy. The hydrogen is contained in a hydrocarbon group material such as methanol, ethanol, and/or natural gas. Fuel cell systems include a system that uses liquid hydrogen and a system that uses hydrogen gas.

A fuel cell that uses hydrogen gas includes a fuel cell stack and a fuel processor. The fuel cell stack constitutes a main body of the fuel cell and has a few to a few tens of unit cells in its fuel cell structure, each having a membrane electrode assembly (MEA) and a separator.

FIG. 1 is a block diagram of a conventional fuel cell system.

Referring to FIG. 1, a fuel that includes hydrogen atoms is reformed into hydrogen gas in a fuel processor, and the hydrogen gas is supplied to a fuel cell stack. The fuel cell stack generates electricity through an electrochemical reaction between the hydrogen gas and oxygen.

The fuel processor includes a desulfurizer and a hydrogen generator. The hydrogen generator includes a fuel reformer and a shift reactor. The desulfurizer removes sulfur from the fuel to prevent catalysts in the fuel reformer and the shift reactor from being adversely affected by sulfur compounds.

The fuel reformer produces hydrogen by reforming hydrocarbon, but also produces carbon dioxide and carbon monoxide. The carbon monoxide adversely affects a catalyst used for an electrode of the fuel cell stack. Therefore, the reformed fuel cannot be directly fed to the fuel cell stack, but must be passed through a shift reactor, which is a carbon monoxide removing apparatus. The shift reactor may reduce the carbon monoxide content in the fuel to less than 10 ppm.

To remove the carbon monoxide, the following three reactions, that is, shift reaction/methanation reaction/PROX reaction have been used.

$$CO + H_2O \rightarrow CO_2 + H_2 \quad \text{[Reaction 1]}$$

$$CO + 2H_2 \rightarrow CH_4 + \tfrac{1}{2}O_2 \quad \text{[Reaction 2]}$$

$$CO + \tfrac{1}{2}O_2 \rightarrow CO_2 \quad \text{[Reaction 3]}$$

To obtain less than 10 ppm carbon monoxide content in the fuel using the above shift reaction, a shift reactor must be maintained at a temperature greater than 200° C. It takes about one hour to raise the temperature of the shift reactor to 200° C. However, it is a waste of time to wait for an hour to use electricity when electricity is readily available whenever it is necessary. Therefore, much research has been conducted to improve this adverse effect.

An apparatus using one burner that can sequentially heat a fuel reformer and a shift reactor has been disclosed in Japanese Patent Publication No. 2004-31280. When the shift reactor is heated using the burner for heating the fuel reformer, the shift reactor is separately positioned from the burner, and a long time is required to raise the shift reactor temperature to its operating temperature.

A system that heats the shift reactor using an additional electric heater has been disclosed in Japanese Publication Patent No. 2001-354404. However, this system consumes much electrical energy.

Accordingly, there is a need to develop a hydrogen generator that has a simple structure and can rapidly raise the temperature of a shift reactor.

SUMMARY OF THE INVENTION

Aspects of the present invention include a hydrogen generator having double burners in order to reduce the time taken to begin a shift reaction of a shift reactor.

Aspects of the present invention also include a method of operating a hydrogen generator.

According to an aspect of the present invention, there is a hydrogen generator having double burners, including a housing, a barrier wall to divide a space in the housing into a first chamber and a second chamber, a fuel reformer installed in the first chamber, a first burner installed in the first chamber to heat the fuel reformer, a shift reactor installed in the second chamber, a second burner formed in the barrier wall to heat the shift reactor, and a first igniter and a second igniter that respectively ignite the first burner and the second burner.

According to an aspect of the present invention, the second burner may comprise a plurality of holes formed in a region of the barrier wall that corresponds to the shift reactor.

According to an aspect of the present invention, the holes of the second burner respectively may have a diameter of about 3 mm or less.

According to an aspect of the present invention, a gas inlet/outlet for passing gases from the first chamber into the second chamber may be formed in the barrier wall.

According to an aspect of the present invention, the second igniter may be an ignition plug.

According to another aspect of the present invention, there is a method of operating the hydrogen generator having double burners, including heating a shift reactor using a second burner by burning fuel supplied to a first burner, heating a fuel reformer by igniting the first burner when the temperature of the shift reactor is at or higher than a predetermined temperature, wherein the second burner is turned off by cutting off a fuel supply to the second burner when the first burner ignites.

According to an aspect of the present invention, the heating of the shift reactor may comprise closing a gas inlet/outlet formed in the barrier wall, and the heating of the fuel reformer may comprise opening the gas inlet/outlet.

According to another aspect of the present invention, there is a hydrogen generator having double burners, including a wall, a first chamber positioned on one side of the wall and having a first burner, and a second chamber positioned on another opposite side of the wall and having a second burner, wherein fuel gases entering the first and second chambers through the first burner is burned by the second burner to directly heat the second chamber without being burned by the first burner.

According to another aspect of the present invention, there is a method of operating a hydrogen generator having double burners and a first chamber with a fuel reformer and a second chamber with a shift reactor, including passing a fuel from the first chamber into the second chamber without burning the fuel in the first chamber.

A hydrogen generator, including a fuel reformer to reform hydrocarbons, a shift reactor to reduce carbon monoxide, a first burner to heat the fuel reformer, a second burner to heat the shift reactor, and a single fuel line to supply fuel to both the first and second burners.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
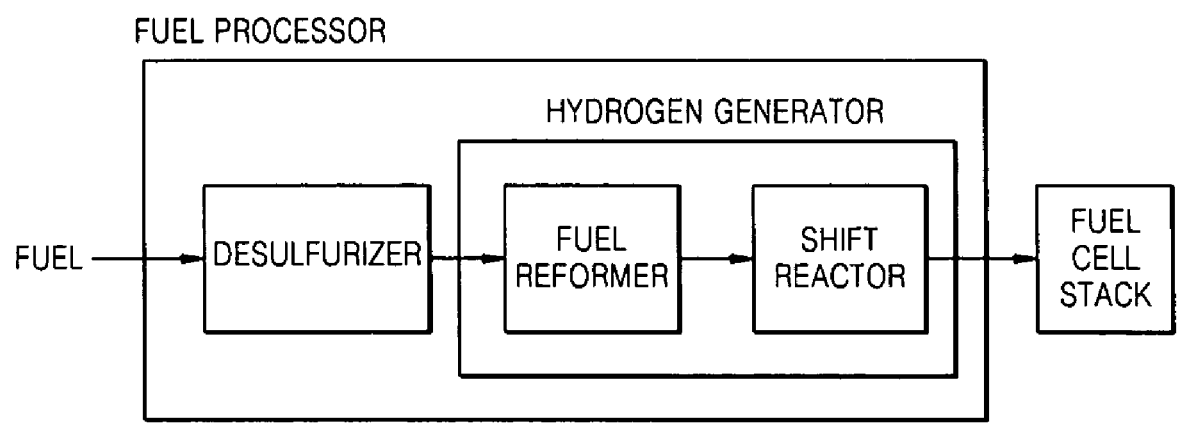
FIG. 1 is a block diagram of a conventional fuel cell system.

Reference will now be made in detail to the aspects of the present invention, examples of which are illustrated in the accompanying drawings, wherein like reference numerals refer to the like elements throughout. The aspects are described below in order to explain the present invention by referring to the figures. In the drawings, the thicknesses of layers and regions are exaggerated for clarity.

Figure 2:
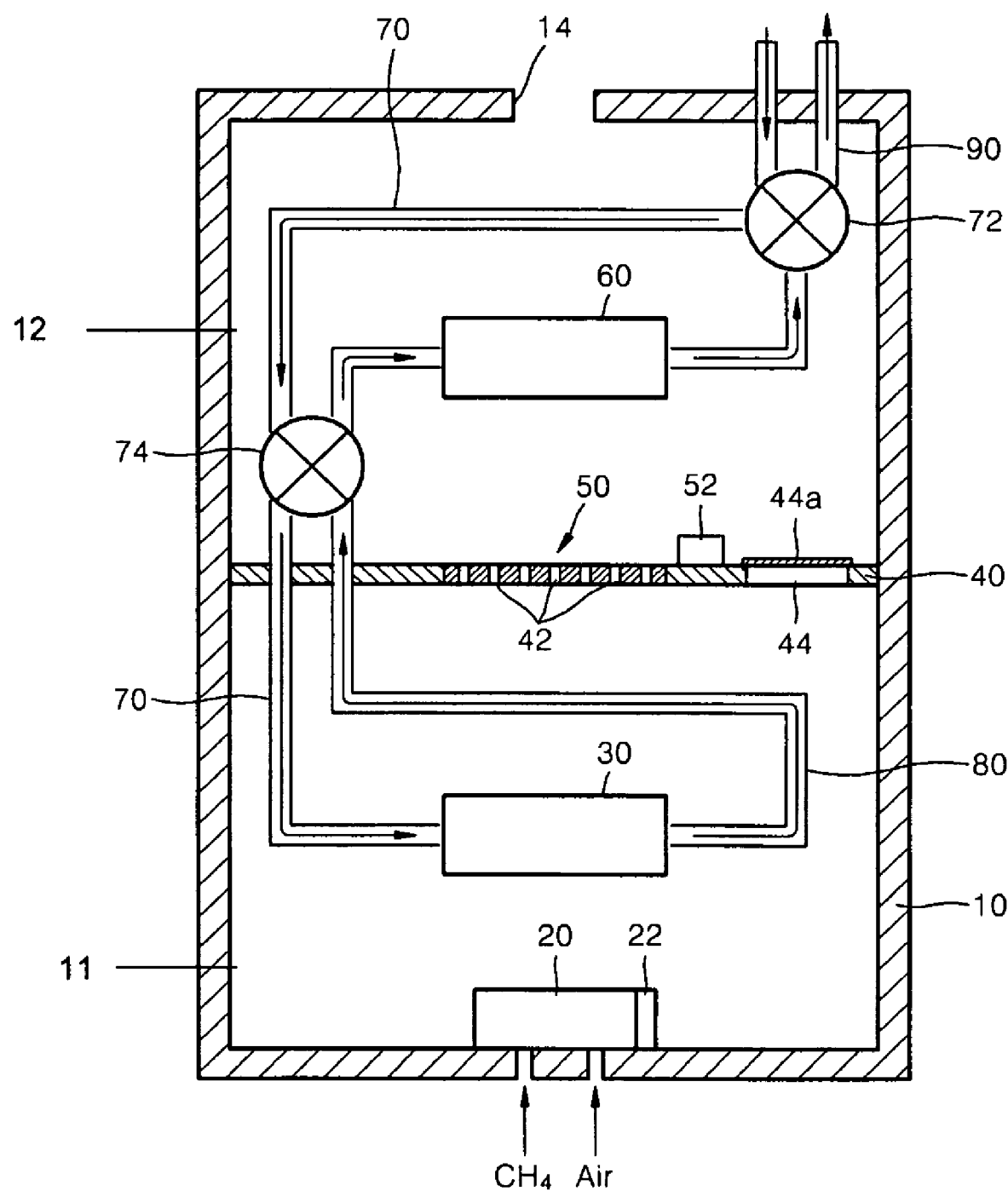
FIG. 2 is a schematic drawing of a hydrogen generator having double burners according to an aspect of the present invention.

FIG. 2 is a schematic drawing of a hydrogen generator having double burners according to an aspect of the present invention.

Referring to FIG. 2, a fuel reformer 30 and a shift reactor 60 are disposed in a housing 10. The fuel reformer 30 and the shift reactor 60 respectively include a catalyst (not shown) used for fuel reforming or for a shift reaction. A first burner 20 is installed or mounted on a side (e.g., in a lower side in FIG. 2) of the fuel reformer 30. A fuel supply such as hydrocarbon gas, for example, methane, and air (or oxygen rich air), is supplied to the first burner 20 from the outside of the housing 10. A first igniter 22 to ignite the first burner 20 is installed or mounted on the first burner 20.

A barrier wall 40 to divide a space of the housing 10 into a first chamber 11 and a second chamber 12 is formed in the housing 10. A second burner 50 is installed, mounted, or formed at the barrier wall 40. The fuel reformer 30 is installed in the first chamber 11 and the shift reactor 60 is installed in the second chamber 12. The shift reactor 60 is installed over or down stream of the second burner 50. The second burner 50 is used to initially heat the shift reactor 60. A second igniter 52, such as an ignition plug to ignite the second burner 50, is installed or mounted on the barrier wall 40 adjacent to a side of the second burner 50, preferably on the second chamber side of the barrier wall 40. Also, the barrier wall 40 includes a gas inlet/outlet 44, and a cover 44a to open or close the gas inlet/outlet 44.

In various aspects of the present invention, a plurality of holes 42 is formed in the barrier wall 40 as a part of the second burner 50. However, such is not required and a device similar to the first burner 20 may be installed at the barrier wall 40 to act as the second burner 50. In the former case, the holes 42 may be formed to have a diameter of approximately less than about 3 mm to reduce flash back of flames.

The hydrogen generator according to aspects of the present invention includes a first pipe 70 to supply raw material, such as hydrocarbon gas, for example, methane, and water from the outside of the housing 10 to the fuel reformer 30, a second pipe 80 to convey reformed hydrogen gas, carbon dioxide, carbon monoxide, and water vapor from the fuel reformer 30 to the shift reactor 60, and a third pipe 90 to discharge hydrogen gas from the shift reactor 60 to the outside of the housing 10. A first heat exchanger 72 is installed between the first pipe 70 and the third pipe 90, and a second heat exchanger 74 is installed between the first pipe 70 and the second pipe 80.

In various aspects of the present invention, the first pipe 70 may enter the housing 10 at any point and the third pipe 90 may exit the housing at any point. Further, it is understood that the number of pipes may be changed as needed. Additionally, in various aspects, the heat exchangers 72 and 74 can be formed in various ways. For example, the first heat exchanger 72 may be formed in the second chamber 12 as shown in FIG. 2, or may be formed in the first chamber 11. Further, the second heat exchanger 74 may be formed in the second chamber 12 as shown in FIG. 2, or may be formed in the first chamber 11. Additionally, in various aspects, the first pipe 70 can be formed to pass through chambers (not shown) formed at the second pipe 80 and the third pipe 90, or may be formed adjacent to the second pipe 80 and the third pipe 90 to cause heat exchange through its entire length.

The housing 10 according to aspects of the present invention includes a gas exit 14 to exhaust gases from the first and second burners 20 and 50. The exhaust gases from the first burner 20 are used to preheat the shift reactor 60, the first pipe 70, and the second pipe 80. The housing 10, the barrier wall 40, and the burner 50 can be formed of a fire resisting and low thermal conductive material. In various aspects of the present invention, such materials may be ceramics.

Figure 3:
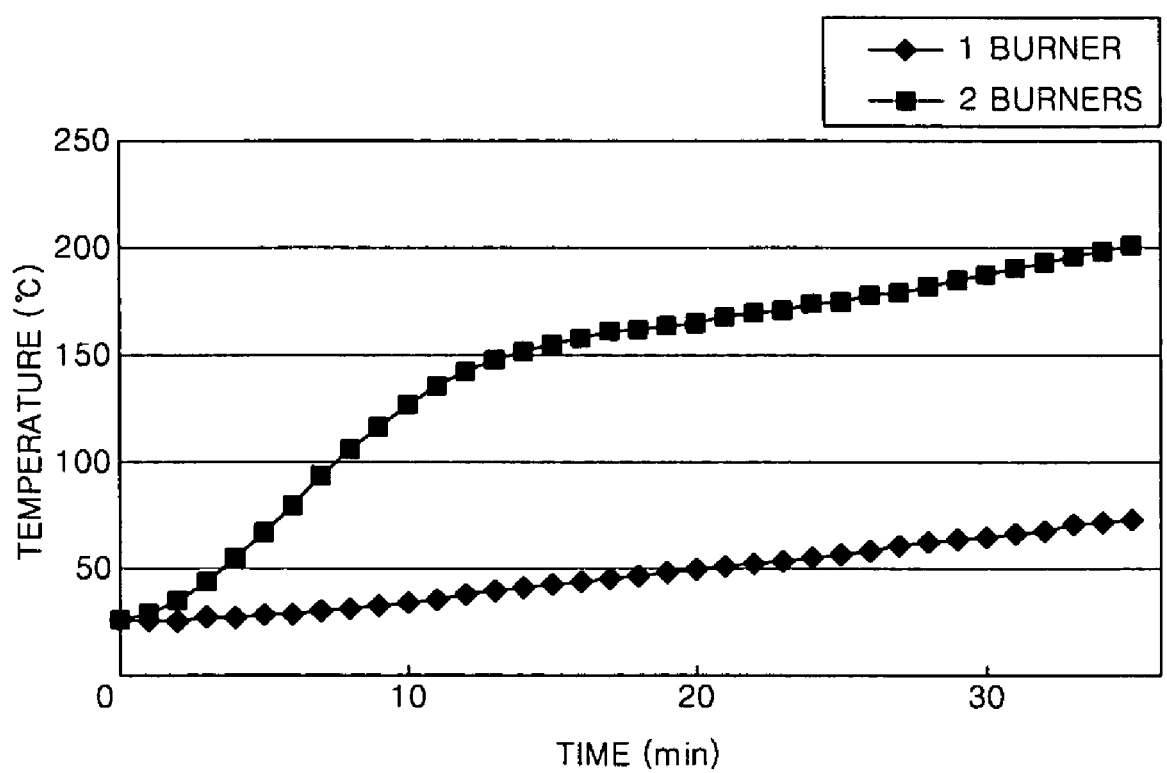
FIG. 3 is a graph showing time variations of temperatures of shift reactors of a hydrogen generator having double burners according to an aspect of the present invention and a conventional hydrogen generator having one burner.

FIG. 3 is a graph showing time variations of temperatures of shift reactors of a hydrogen generator having double burners according to aspects of the present invention and a conventional hydrogen generator having one burner.

Referring to FIG. 3, the shift reactor 60 of the hydrogen generator having double burners took approximately 35 minutes to reach 200° C., which is an operating temperature to achieve a shift reaction. However, the shift reactor 60 of the hydrogen generator having one burner took 35 minutes to reach 100° C., and took more than 60 minutes to reach 200° C. As described above, the hydrogen generator having double burners according to aspects of the present invention can reduce the time taken to begin the shift reaction. Also, the hydrogen generator according to the present invention may dispense with an additional fuel supply line for the second burner 50 since fuel supply and oxygen are supplied through the first burner 20 for the fuel reformer 30. In other words, the fuel supply and oxygen for the second burner 50 is supplied through the first chamber 20. However, it is understood that in other aspects, both the first burner 20 and the second burner 50 may be supplied by a same fuel supply line or by separate fuel supply lines.

A method of operating the hydrogen generator having double burners according to aspects of the present invention will now be described.

Fuel supply and air containing a desired amount of oxygen are supplied to the first chamber 11 through a fuel pipe (not shown) and an air pipe (not shown) connected to the first burner 20 while the gas inlet/outlet 44 is closed by the cover 44a. The fuel supply and air supplied to the first chamber 11 move to the second chamber 12 through the holes 42 of the second burner 50. At this time, when the second igniter 52 is ignited, the second burner 50 is ignited and begins to produce flames and hot exhaust gases. Accordingly, the shift reactor 60 is heated directly. Afterwards, when the temperature of the shift reactor 60 reaches approximately 100° C., the first burner 20 is ignited using the first igniter 22. Simultaneously with the ignition of the first burner 20 or after a short time-lag from the ignition of the first burner 20, the gas inlet/outlet 44 is opened.

After the gas inlet/outlet 44 is opened, hot exhaust gases which include $CO_2$, $H_2O$, air, and/or oxygen, from the first burner 20 enter into the second chamber 12 through the gas inlet/outlet 44 and the second burner 50. The second burner 50 is subsequently turned off, and becomes a pathway for the hot exhaust gases from the first burner 20. When the temperature of the fuel reformer 30 rises to about 200° C. or more due to passage of the hot exhaust gases through the second chamber 12, water is supplied through the first pipe 70. The water supplied to the first pipe 70 vaporizes while passing through the first pipe 70, the first heat exchanger 72, and the second heat exchanger 74. Then, the temperature of the shift reactor 60 rises due to the water vapor passed through the fuel reformer 30 and the hot exhaust gases from the first burner 20. When the temperature of the fuel reformer 30 reaches to about 600° C. or more and the temperature of the shift reactor 60 reaches to about 200° C. or more, raw material, such as hydrocarbon gas and water, are passed through the first pipe 70. In various aspects of the present invention, the temperatures of the fuel reformer 30 and the shift reactor 60 can be controlled not only by the amount of fuel supply and/or air supplied to the first burner 20 and/or the second burner 50, but also by the amount of raw material, such as hydrocarbon and/or water, supplied to the first pipe 70. Meanwhile, the first and second heat exchangers 72 and 74 can preheat the raw material, such as hydrocarbon and/or water, passing through the first pipe 70.

The hot exhaust gases that enter the second chamber 12 are exhausted to the outside of the housing 10 through the gas exit 14. The exhaust gases that pass through the gas exit 14 can be used for preheating a fuel stack (not shown). Hydrogen gas that passes through the third pipe 90 can be supplied to an anode electrode.

As discussed above, there are at least three sources of heating and/or preheating of the first, second, and/or third pipes 70, 80, and 90; the fuel reformer 30 and the shift reactor 60; and/or the hydrocarbon and/or water. These are the hot exhaust gases, the heat exchangers 72 and 74, and direct heating from the burners 20 and 50.

A hydrogen generator having double burners according to the present invention can reduce the time taken to begin a shift reaction of the hydrogen generator. Also, a burner, which is used for a shift reactor and includes a barrier wall having holes, uses fuel supply and oxygen supplied to a burner for a fuel reformer. Therefore, one fuel supply line is used for two burners, thereby simplifying the structure of the hydrogen generator.

Although a few aspects of the present invention have been shown and described, it would be appreciated by those skilled in the art that changes may be made in these aspects without departing from the principles and spirit of the invention, the scope of which is defined in the claims and their equivalents.

What is claimed is:

1. A hydrogen generator having double burners, comprising:
    a housing;
    a barrier wall to divide a space in the housing into a first chamber and a second chamber;
    a fuel reformer installed in the first chamber;
    a first burner installed in the first chamber to heat the fuel reformer;
    a shift reactor installed in the second chamber;
    a second burner formed in the barrier wall to heat the shift reactor; and
    a first igniter and a second igniter that respectively ignite the first burner and the second burner.

2. The hydrogen generator of claim 1, wherein the second burner comprises a plurality of holes formed in a region of the barrier wall that corresponds to the shift reactor.

3. The hydrogen generator of claim 2, wherein the holes of the second burner respectively have a diameter of less than about 3 mm.

4. The hydrogen generator of claim 1, wherein a gas inlet/outlet for passing gases from the first chamber into the second chamber is formed in the barrier wall.

5. The hydrogen generator of claim 1, wherein the second igniter is an ignition plug.

6. A method of operating the hydrogen generator having double burners according claim 1, comprising:
    heating the shift reactor using the second burner by burning fuel supplied to the first burner; and
    heating the fuel reformer by igniting the first burner when a temperature of the shift reactor is at or higher than a predetermined temperature, wherein the second burner is turned off by cutting off a fuel supply to the second burner when the first burner ignites.

7. The method of claim 6, wherein
    the heating of the shift reactor further comprises closing a gas inlet/outlet formed in the barrier wall, and
    the heating of the fuel reformer further comprises opening the gas inlet/outlet.

8. The method of claim 6, wherein the fuel supply to the second burner is cut off by closing a gas inlet/outlet formed in the barrier wall.

9. The method of claim 6, further comprising passing the fuel from the first chamber into the second chamber without burning the fuel in the first chamber.

10. The method of claim 6, wherein the heating of the shift reactor occurs prior to heating the fuel reformer.

11. The method of claim 6, wherein the predetermined temperature is about 100° C.

12. The hydrogen generator of claim 1, further comprising:
    a first pipe to supply hydrocarbon gas and water from the outside of the housing to the fuel reformer;
    a second pipe to convey reformed hydrogen gas, carbon dioxide, carbon monoxide, and/or water vapor from the fuel reformer to the shift reactor; and
    a third pipe to discharge hydrogen gas from the shift reactor to the outside of the housing.

13. The hydrogen generator of claim 12, further comprising:
   a first heat exchanger is installed between the first pipe and the third pipe; and
   a second heat exchanger is installed between the first pipe and the second pipe.

14. The hydrogen generator of claim 1 further comprising only one fuel supply line to supply fuel to both the first and second burners.

15. The hydrogen generator of claim 1, wherein the second chamber is positioned down stream of the first chamber.

* * * * *

UNITED STATES PATENT AND TRADEMARK OFFICE
CERTIFICATE OF CORRECTION

PATENT NO. : 7,740,811 B2  Page 1 of 1
APPLICATION NO. : 11/507548
DATED : June 22, 2010
INVENTOR(S) : Tae-sang Park et al.

It is certified that error appears in the above-identified patent and that said Letters Patent is hereby corrected as shown below:

At Title Page 1, Item 57, Line 3, change "samewhere" to --same where--.

Column 5, Line 20 (Approx.), change "gases" to --gases,--.

Column 6, Line 35, in Claim 6, after "according" insert --to--.

Signed and Sealed this

Thirtieth Day of November, 2010

David J. Kappos
*Director of the United States Patent and Trademark Office*